(12) United States Patent
Washburn et al.

(10) Patent No.: US 9,346,531 B1
(45) Date of Patent: May 24, 2016

(54) BALLOON GAS RELEASE FLIGHT TERMINATION SYSTEM

(71) Applicant: Google Inc., Mountain View, CA (US)

(72) Inventors: Shane Washburn, Oakland, CA (US); Peter Isaac Capraro, San Francisco, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 14/480,848

(22) Filed: Sep. 9, 2014

(51) Int. Cl.
B64B 1/62 (2006.01)

(52) U.S. Cl.
CPC .................................... B64B 1/62 (2013.01)

(58) Field of Classification Search
CPC ................ B64B 1/46; B64B 1/48; B64B 1/62
See application file for complete search history.

(56) References Cited

U.S. PATENT DOCUMENTS

| | | | | |
|---|---|---|---|---|
| 2,756,948 A | * | 7/1956 | Winzen | B64B 1/40 244/31 |
| 3,302,906 A | * | 2/1967 | Winker | B64B 1/62 102/307 |
| 3,451,649 A | * | 6/1969 | Weiss | B64B 1/64 244/99 |
| 3,614,031 A | * | 10/1971 | Demboski | B64B 1/62 244/138 R |
| 2011/0297784 A1 | | 12/2011 | Huens | |
| 2014/0014770 A1 | | 1/2014 | Teller et al. | |

FOREIGN PATENT DOCUMENTS

| | | |
|---|---|---|
| JP | H03262797 A | 11/1991 |
| JP | 10157697 | 6/1998 |

\* cited by examiner

*Primary Examiner* — Brian M O'Hara
*Assistant Examiner* — Michael Kreiner
(74) *Attorney, Agent, or Firm* — Lerner, David, Littenberg, Krumholz & Mentlik, LLP

(57) ABSTRACT

A control system for terminating flight of a balloon having a balloon envelope is provided. The control system includes a shuttle that has one or more cutting blades. The cutting blades are configured to cut open the balloon envelope. A tubular track is attached to a section of the balloon envelope. This tubular track has a guiding portion arranged to receive and guide the shuttle along the track. The control system includes a type of releasable ballast attached to the shuttle. When the ballast is released, the ballast is configured to move the shuttle along the tubular track in order to cause at least one of the cutting blades to cut open a portion of the balloon envelope. This allows lift gas to escape from the balloon envelope.

20 Claims, 9 Drawing Sheets

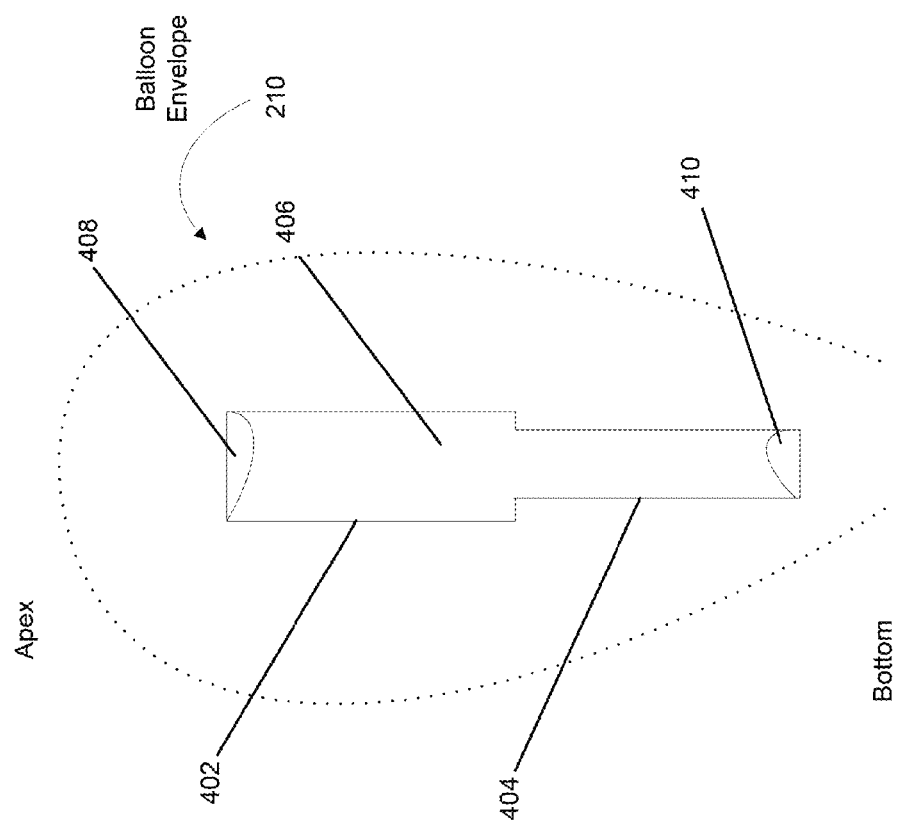

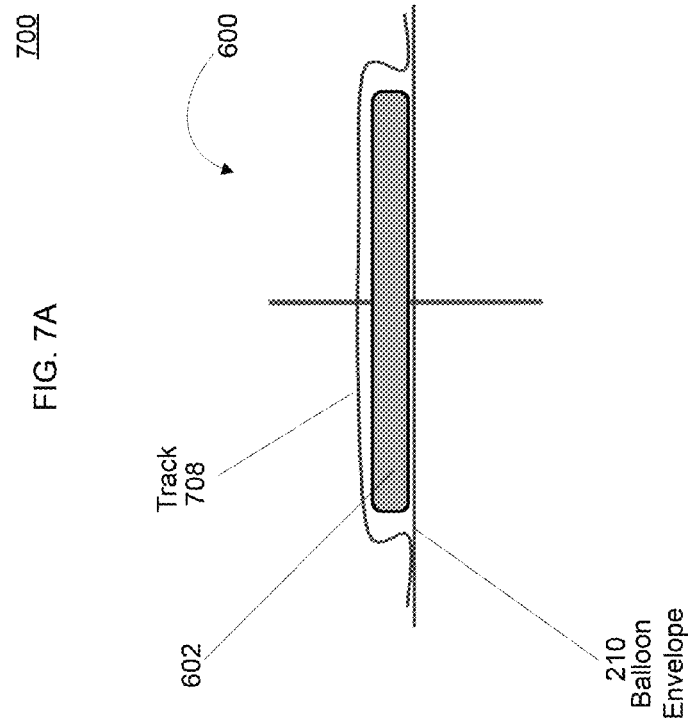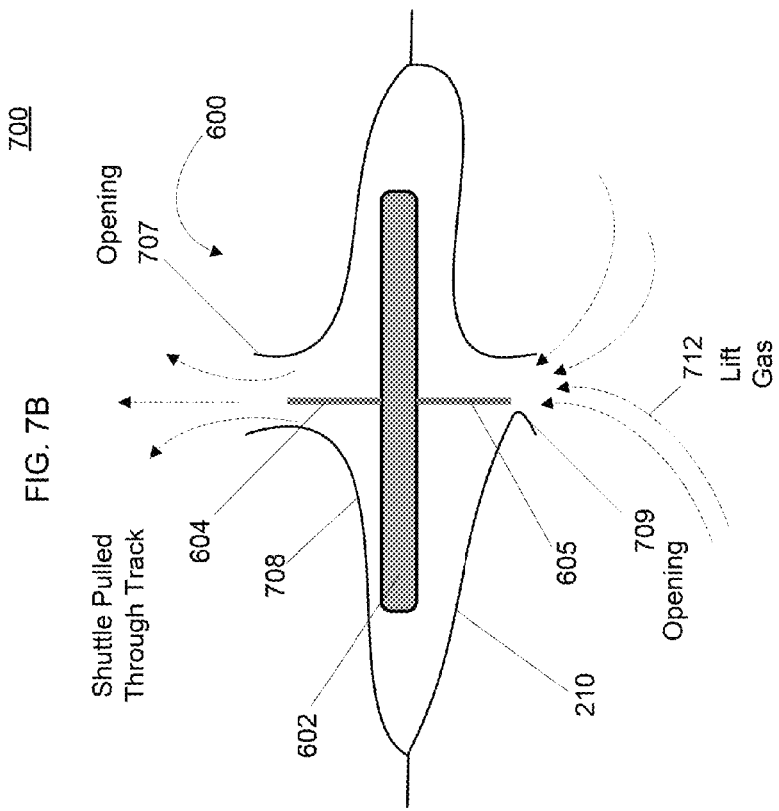

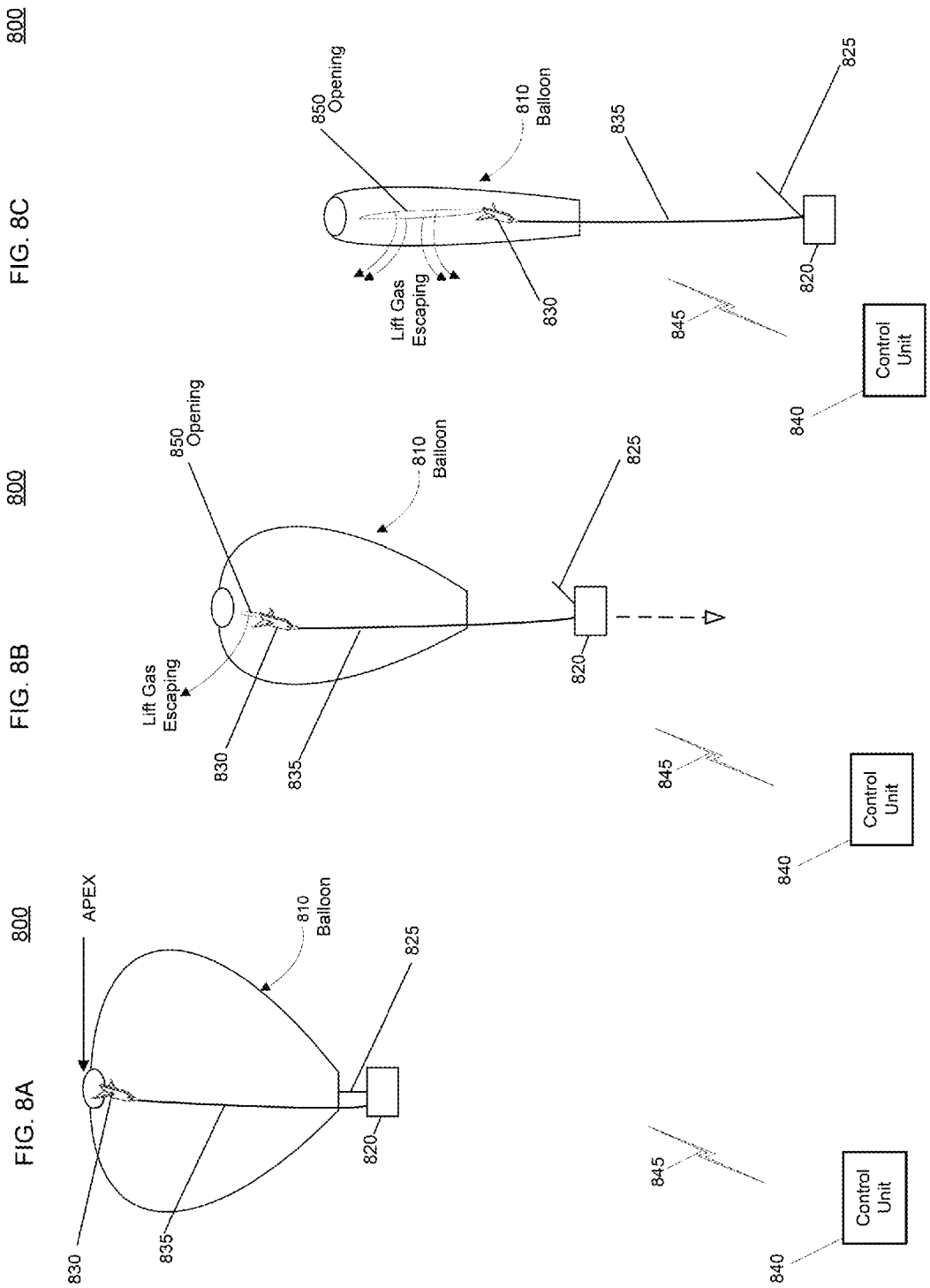

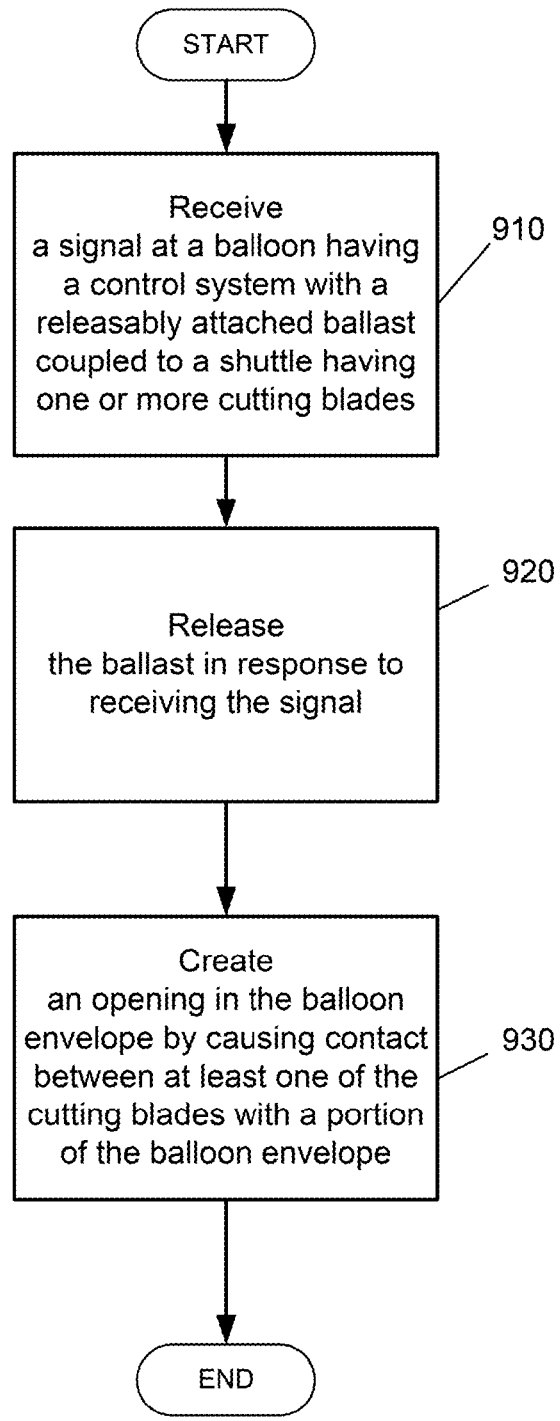

BALLOON GAS RELEASE FLIGHT TERMINATION SYSTEM

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons. During normal operations, the balloon envelope is filled with gas so that it can float above the Earth in the stratosphere. At some point, the balloon may need to be brought back to the ground, for example, for retrieval, maintenance or servicing of balloon components.

BRIEF SUMMARY

Aspects of the present disclosure are advantageous for providing control system for terminating flight of a balloon having a balloon envelope is provided. The control system includes a shuttle that has one or more cutting blades. The cutting blades are configured to cut open the balloon envelope. A tubular track is attached to a section of the balloon envelope. This tubular track has a guiding portion arranged to receive and guide the shuttle along the track. The control system includes a type of releasable ballast attached to the shuttle. When the ballast is released, the ballast is configured to move the shuttle along the tubular track in order to cause at least one of the cutting blades to cut open a portion of the balloon envelope. This allows lift gas to escape from the balloon envelope.

In another embodiment, a system is provided. The system includes a balloon having a balloon envelope and a control system for terminating flight of the balloon. The control system includes a shuttle that has one or more cutting blades. The cutting blades are configured to cut open the balloon envelope. A tubular track is attached to a section of the balloon envelope. This tubular track has a guiding portion arranged to receive and guide the shuttle along the track. The control system includes a type of releasable ballast attached to the shuttle. When the ballast is released, the ballast is configured to move the shuttle along the tubular track in order to cause at least one of the cutting blades to cut open a portion of the balloon envelope. This allows lift gas to escape from the balloon envelope.

In yet another embodiment a method of terminating flight of a balloon having a balloon envelope is provided. The method includes receiving a signal at control system arranged at an apex of the balloon envelope. The control system includes a shuttle that has one or more cutting blades. The cutting blades are configured to cut open the balloon envelope. A tubular track may be attached to a section of the balloon envelope. This tubular track has a guiding portion arranged to receive and guide the shuttle along the track. The control system includes a type of releasable ballast attached to the shuttle. In response to receiving the signal, the control system causes the ballast to be released. When the ballast is released, an opening in the balloon envelope may be created by causing contact between at least one of the cutting blades of the shuttle and a portion of the balloon envelope. This opening may be arranged to allow lift gas to escape and the balloon envelope to descend.

BRIEF DESCRIPTION OF THE DRAWINGS

FIG. 4 is a perspective view of a track in accordance with aspects of the present disclosure.

FIGS. 7A-7B. are cutaway views of the shuttle of FIGS. 6A-6B in accordance with aspects of the present disclosure.

FIGS. 8A-8C are examples of a control system terminating the flight of a high altitude balloon in accordance with aspects of the present disclosure.

FIG. 9 is an example of a flow diagram in accordance with aspects of the disclosure.

DETAILED DESCRIPTION

Figure 1:
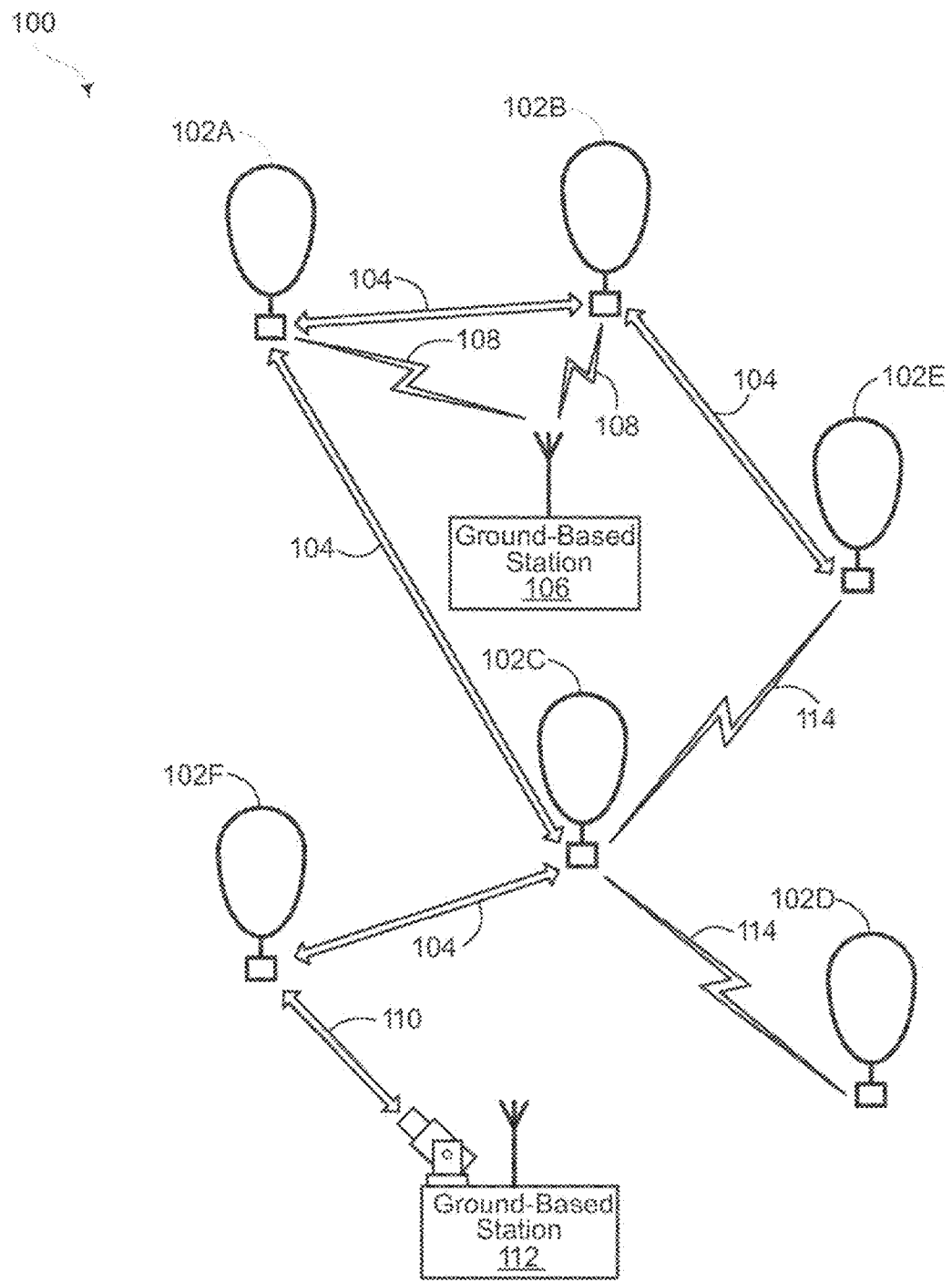
FIG. 1 is a functional diagram of a system in accordance with aspects of the present disclosure.

The present disclosure generally relates to providing a control system for terminating a flight of a high-altitude balloon having a balloon envelope. The balloon envelope may be inflated with lift gas that may cause the balloon to elevate into the stratosphere. In some situations, the balloon may need to come down either intentionally or due to a catastrophic failure. The techniques described herein may allow a user on the ground to send a command to activate a flight termination system attached to the balloon that causes the balloon envelope to release lift gas in a manner that allows the balloon to descend back to Earth.

The control system can include a shuttle having a cutting blade and a tubular track for receiving the shuttle. In some embodiments, the tubular track may be attached to a section of the balloon envelope. The cutting blade may be configured to cut open the balloon envelope. For example, the cutting blade may be a razor or any other type of similar blade or blades that are sharp enough to pierce material of the balloon envelope.

In some examples, the tubular track may have a guiding portion that can be arranged to receive and guide the shuttle along the section of the balloon envelope. The tubular track can be made of a flexible material that may be similar or the same as material used to make the balloon envelope. In some embodiments, this track may be arranged onto the balloon envelope such that a length of the guiding portion may longitudinally rest from an apex to a bottom portion of the balloon (opposite the apex). In some embodiments, a body of the shuttle may have a substantially planar surface that can help the shuttle to stay in contact with the balloon envelope as the shuttle moves through the tubular track.

To move the shuttle through the tubular track along the guiding portion, various techniques may be used. In one example, the control system may include a type of weight or ballast attached to the shuttle. In some examples, the shuttle may be directly attached to a payload of the balloon. The ballast/payload, when released, may fall a certain predetermined distance whereby the attached shuttle may be pulled through the tubular track. This in turn causes the cutting blade to cut open at least a portion of the balloon envelope, thereby allowing the lift gas to escape from the balloon envelope, and the balloon to descend back to Earth.

In some embodiments, a controllable release device may be attached to the ballast and/or payload. The controllable release device may be configured to release the ballast/payload causing the shuttle to be pulled through the tubular track. For example, in response to a command, the controllable release device may release the ballast/payload from the balloon, which in turn may cause the attached shuttle to be pulled through the tubular track. In that regard, a control unit in communication with the controllable release device may be used to remotely send the command that can activate the release of the ballast/payload. An advantage of using the control unit is that by remotely activating the controllable release device lift gas can be made to escape from the balloon envelope while the balloon is far above the Earth.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." The system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
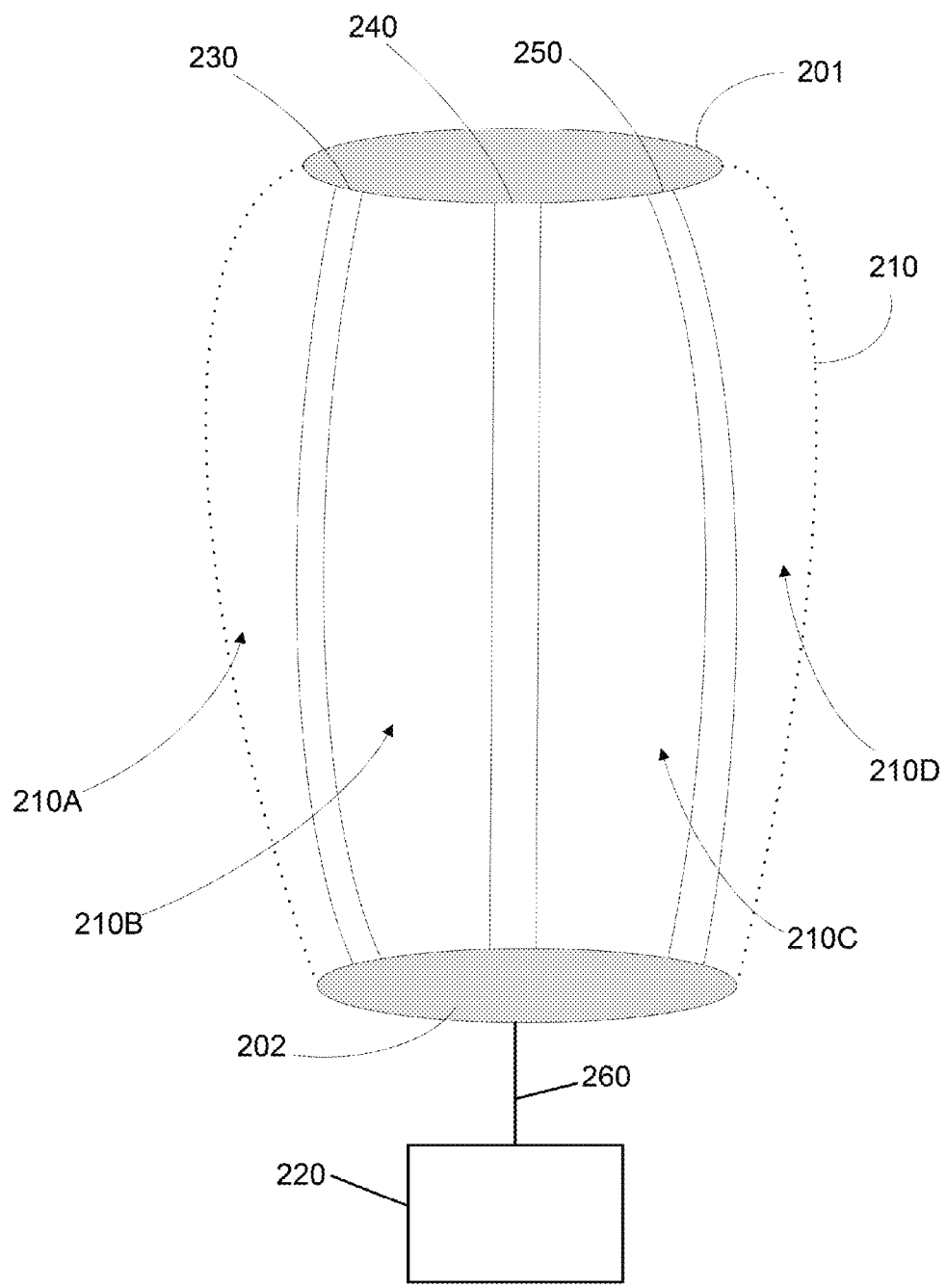
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using a type of plate, such as top cap 201 positioned at the apex of balloon envelope 210. Bottom ends of the tendons 230, 240 and 250 may also be connected to one another. For example, a corresponding plate, e.g., bottom cap 202, is disposed at a base or bottom portion of the balloon envelope 210 opposite of the apex. The top cap 201 at the apex may be the same size and shape as and bottom cap 202 at the bottom portion. Both caps include corresponding components for attaching the tendons 230, 240 and 250. In some examples, the top cap 201 may serve a mounting point for certain systems attached to the balloon 200, such as a flight termination system. An example of such this type of flight termination system is further described below.

Example Control System

As noted above, one aspect of the present technology provides a control system for remotely terminating flight of a balloon. For example, the techniques disclosed herein seek to release the pressurized lift gas from within the balloon envelope by creating an opening for the gas to escape. In some aspect, the control system can be configured to rapidly create this opening in the balloon envelope.

Figure 3:
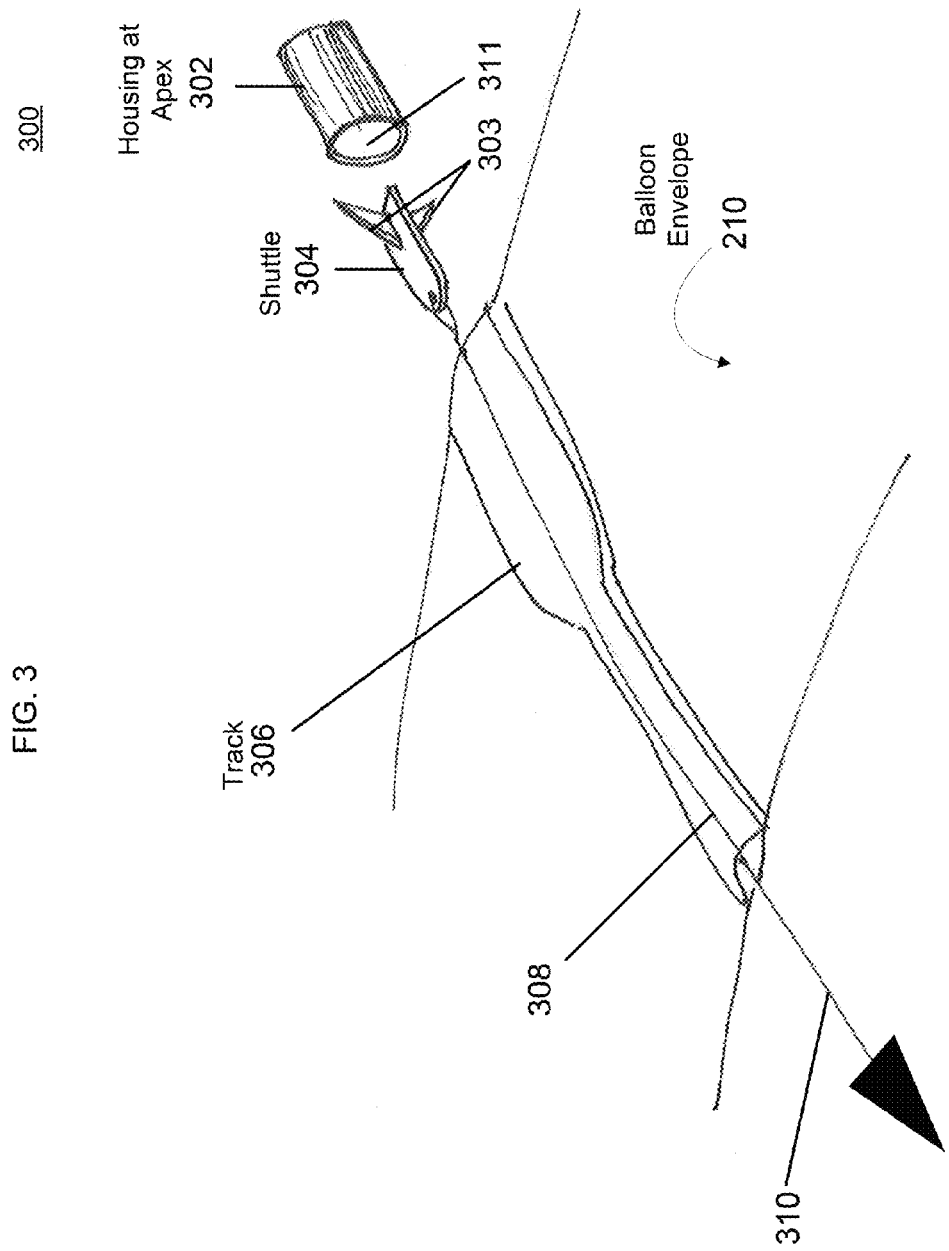
FIG. 3 is an example of a control system in accordance with aspects of the present disclosure.

FIG. 3 is an example of a control system 300, for example, for creating an opening in a balloon envelope. The control system 300 has various components including a housing 302 that may be arranged at an apex and/or top cap 201 of balloon envelope 210. The control system also includes a shuttle 304 having one or more cutting blades 303 that are configured to cut open the balloon envelope 210 and a track 306 attached to a section of the balloon envelope 210. In some embodiments, a type of ballast may be attached to the shuttle 304 via cord 308. In some examples, the ballast may include a counter weight or payload, such as payload 220.

Cord 308 may be made of a material of given strength properties that are capable of supporting the weight of the ballast without breaking, such a metal fiber. A length of the cord 308 may be arranged or otherwise fed through an inner portion of the track 308. The length may be configured so that the shuttle 304 can be displaced a certain length against an outer shell of the balloon envelope 210 when the cord 308 is pulled by the ballast.

In this regard, the ballast may be configured to pull the cord 308 in a direction with respect to an origination of the track 306, such as in the direction of arrow 310. Movement of the ballast may thus cause a pulling force on the cord 308, which then pulls the shuttle 304 along the track 306. This in turn may cause at least one of the cutting blades 303 to cut open a portion of the balloon envelope 210, thereby allowing lift gas to escape from the balloon envelope.

Housing 302 may be made of a relatively rigid material, such as plastic or PVC. The housing 320 may include a cavity 311 that can be configured to hold the shuttle 304 therein. In some embodiments, the apex and/or top cap 201 of the balloon may serve as a mounting point for the housing 302. For example, the housing 302 may be coupled to the top cap 201 by using a restraining device (not shown), such as a number of nuts and bolts, cabling/wires or other kinds of similar restraints. This may allow the shuttle 304 to be safely secured to the balloon structure until deployment. In addition, being near the apex of the balloon envelope 210 may help facilitate movement of the shuttle 304 along the track 308.

In some embodiments, a second housing (not shown) may be attached to track 306 at the bottom and/or bottom cap 202 of the balloon envelope 210. The second housing may be configured similarly to housing 302 at the apex and/or top cap 201. For example, the second housing may also be of a relatively rigid material, such as plastic or PVC, and may include a cavity that can be configured to receive the shuttle 304. For example, after the shuttle 304 moves along the track 306, the shuttle 304 may come to rest in the second housing. This may help avoid injury to persons or damage to other objects by the blades 303 of the shuttle 304 when the balloon is descending and afterwards as well as prevent the shuttle from falling off of the balloon.

Track 306 may be constructed of the same material as the balloon envelope 210. For example, the track 306 may be constructed from several types of highly flexible yet lightweight materials, e.g., polyethylene, polyethylene terephthalate, chloroprene and etc. While the track 306 can be of the same material as the balloon envelope 210, the track 306 can alternatively be of a different material than the envelope. In some embodiments, the track 306 can be constructed from any suitable material with similar or different strength properties than the balloon envelope 210. For instance, these suitable materials of the track 306 may be capable of being attached to an outer material of the balloon envelope 210 and can withstand different air pressures and temperature extremes expected at high altitudes.

In FIG. 4, a perspective view of a track 400 (similar to track 308 of FIG. 3) is shown. As shown, the track 400 has a first portion 402, a second portion 404, and a guiding portion 406 disposed there between. In some aspects, the guiding portion 406 can be arranged to receive and guide the shuttle 304 along track 400. In this example, the guiding portion is configured as an inner tube-like structure between the first and second portions 402, 404. Thus, the guiding portion 406 may include first and second openings 408 and 410 that are each configured to allow the shuttle 304 to respectively enter and exit the track 400. In some embodiments, a length of the track 400 may extend from the apex and/or top cap 201 to the bottom and/or bottom cap 202 of the balloon envelope 210. An advantage of arranging the track 400 in this manner is that this arrangement may allow gravitational forces to assist in moving the shuttle 304 through the guiding portion 406.

Guiding portion 406 runs along a lengthwise direction of the track 400 and extends from the first opening 408 to the second opening 408. The guiding portion 406 is configured to guide the shuttle 304 along the track 400. For example, an inner diameter of the guiding portion 406 may be configured or selected depending on the size of the shuttle 304. As shown, the first portion 402 of the track may have a relatively larger diameter (e.g., wider) than the second portion 404.

An advantage of a configuration with different widths of the first and second portions 402 and 404 is that this configuration may help the track 400 to receive and guide the shuttle 304. For example, the wider diameter of the first portion 402 may allow the shuttle 304 to enter the track with greater ease and avoid bumping into an edge of opening 408. The smaller or narrower diameter of the second portion 404 may help the shuttle 304 stay on course by keeping the shuttle 304 from shifting from side to side as the shuttle moves further along the track 400.

To attach the track 400 to the balloon envelope 210, several techniques can be employed. For instance, in some embodiments, the envelope 210 and the track 400 can be manufactured separately and later joined together. In this example, the track 400 may be attached to the envelope 210 by using, for example, a type adhesive or tape or any other adhesive method for sealing the two together. In other embodiments, the envelope 210 and track 400 may be manufactured together so that the track is an integral part of the balloon envelope 210.

Figure 5B:
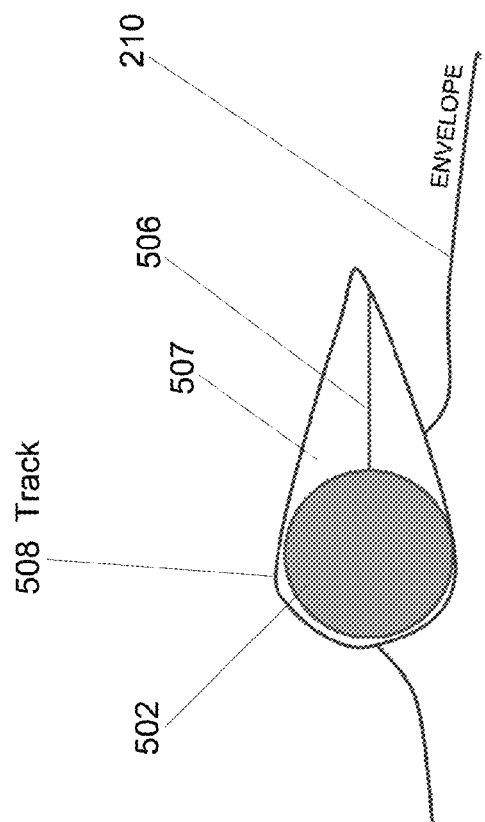
FIGS. 5A-5B are examples of a shuttle in accordance with aspects of the present disclosure.
Figure 5A:
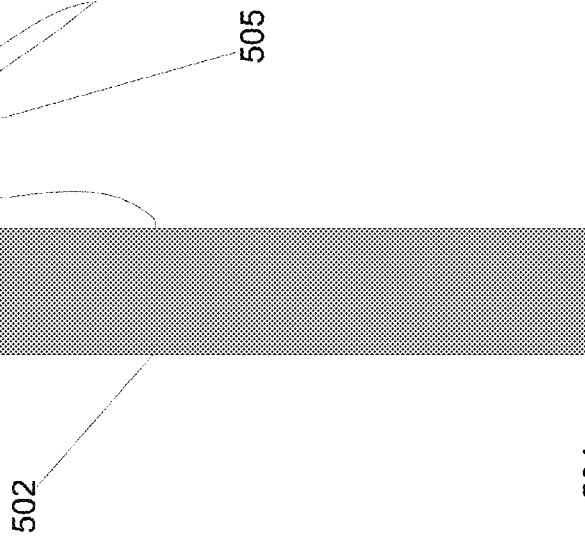

As noted above, the track 400 may hold and guide a shuttle configured to cut open the balloon envelope 210. FIGS. 5A-5B depict examples of a shuttle 500, shown in side and cross sectional views, respectively, that may be used with a track 508 (shown in FIG. 5B), which may be compared to tracks 308 or 400. In this example, the shuttle 500 includes a body portion 502 having a cavity 504 and a cutting blade 505. The body portion 502 may be made of a rigid material, such as plastic, wood or other types of materials with similar or different properties. The shuttle can also have various different shapes and sizes.

As shown in FIG. 5A, one end of the body portion includes cavity 504 and the other end may include a handle portion 506 having a cutting blade 505 attached thereto. The cutting blade 505 may be configured to cut open at least a portion of the balloon envelope. For example, the cutting blade 505 may include a razor blade that is sharp enough to pierce the material of the balloon envelope 210 (shown in FIG. 5B). In some embodiments, a cord (not shown) may be fed through the cavity 504. The cord may be also attached to a weight (not shown), such as the ballast described in the examples above, which can be used to pull the shuttle 500 along the track 400.

As shown in FIG. 5B, body portion 502 of the shuttle 500 has an elongated tubular shape that may help the shuttle move along an inner guiding portion 507 of track 508. In this regard, the guiding portion 507 of track 508 may have a complementary shape as the shuttle 500. When the shuttle 500 enters the track 508, the handle portion 506 may engage a portion of balloon envelope 510 so that cutting blade 505 of the handle portion 506 can cut the portion of the balloon envelope open. Although shuttle 500 is shown with only a single cutting blade, the shuttle 500 can be configured with multiple blades for cutting open additionally portions of the balloon envelope 510 as well as portions of the track 508 itself.

Figure 6B:
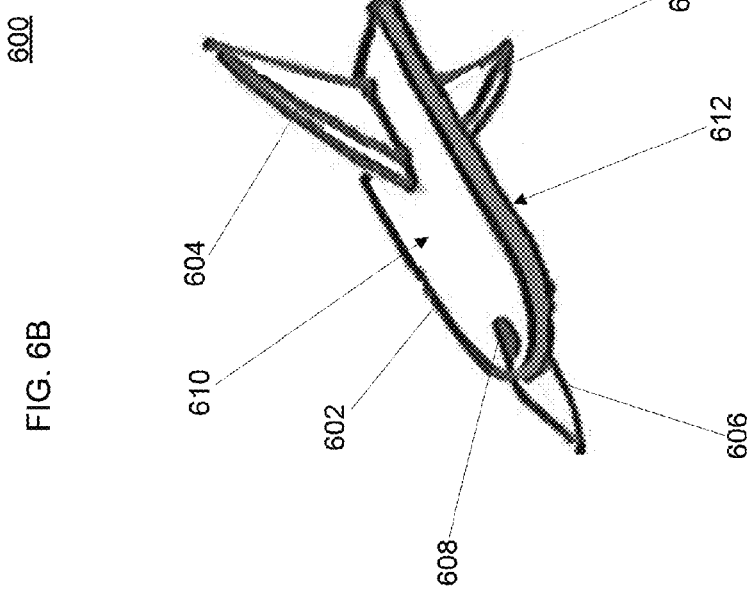
FIGS. 6A-6B are examples of another shuttle in accordance with aspects of the present disclosure.
Figure 6A:
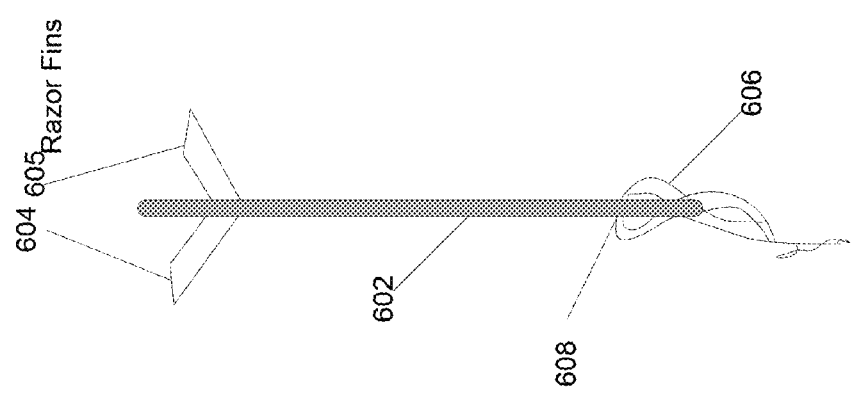

FIGS. 6A-6B depict another example of a shuttle 600 (similar to shuttle 500). As shown in FIG. 6A, the shuttle 600 includes a body portion 602 having one or more, here two, cutting blades 604 and 605 (e.g., razor blade fins) and a cavity 608 for receiving a cord 606. As noted above, the cord 606 may be used for pulling the shuttle 600 through a track in order to cause at least one of the cutting blades 604 and 605 to cut open the balloon envelope. Similarly here, the body portion 502 may be made of a rigid material, such as plastic, wood or other types of materials with similar or different properties. In this example, the body portion 602 of shuttle 600 has a generally flat or planar shape. This generally planar shape may help the shuttle 600 to lay flat against the balloon envelope in order to facilitate the cutting operations of the cutting blades 604 and 605.

In some embodiments, each cutting blade can be attached to a given surface of the body portion 602 so as to protrude from the shuttle 600 in different directions. In this regard, the body portion 602 of shuttle 400 includes first and second surface layers 610 and 612 that may be configured to receive the cutting blades 604 and 605. For example, as shown in FIG. 6B, cutting blade 604 is attached to a first surface layer 610 of body portion 602 and shown protruding in a first direction away from the body portion 602 of shuttle 600. Cutting blade 605 is attached to a second surface layer 612 of body portion 602 and shown protruding in a second direction away from the body portion 602 of the shuttle 600 and opposite of the first direction. By configuring the cutting blades 604 and 605 in opposing directions, the blades can be used to cut open a portion of the balloon envelope as well as a portion of the track in order to further increase the amount of lift gas escaping from the envelope.

FIGS. 7A-7B are side cutaway views of the shuttle 600 of FIGS. 6A-6B. With respect to FIG. 7A, the shuttle 600 is shown disposed within track 708 (which can be for example, one of track 400 of FIG. 4 or track 308 of FIG. 3 or track 508 of FIG. 5). As discussed above, the track 708 may be attached to a portion of balloon envelope 210 and may be used to guide the shuttle along that portion. As the shuttle 600 enters the track 708, the cutting blades 604 and 605 may be engaged. For example, one cutting blade may engage a portion of the track 705 while the other cutting blade may engage a portion of the balloon envelope 210.

In FIG. 7B, the shuttle 600 is shown with the track 708 and the balloon envelope 210 having respective openings 707 and 709 for lift gas to escape. For example, as the shuttle 600 is pulled through the track 708, the cutting blades may begin to cut open the track 708 and the balloon envelope 210. As shown, in this example, cutting blade 604 begins to cut open track 708 and cutting blade 605 begins to cut open the balloon envelope 210. Thereupon, lift gas may pass through the opening 709 in the balloon envelope 210 and then may escape through the opening 707 in the track 708.

FIGS. 8A-8C are examples 800 of a control system 830 (which can be compared to control system 300) for terminating the flight of a high altitude balloon 810 in accordance with aspects of the present disclosure. Turning to FIG. 8A, a balloon 810 (compared to balloon 200) filled with lift gas is shown carrying a payload 820 (or in some instances a ballast/counterweight) in the air. The payload 820 may be releasably attached to the balloon 810 by a connection 825, which may include a cable attached to a controllable releasing device (not shown). In some embodiments, the releasing device may include a remotely controllable release lever, cutting device or other kinds of techniques for severing connection 825.

Control unit 840 may be connected to the releasing device of payload 820 via a communication link 835. For example, the control unit 840 may communicate with the releasing device of payload 820 using communication link 835. In order to communicate using communication link 835, the payload 820 includes communication circuitry (not shown). This communication circuitry may include a receiver/transmitter (not shown) for processing signals to and from the control unit 840. In some examples, these signals may include commands, e.g., for the releasing device to release the payload 820 by severing connection 825. An advantage of the control unit 840 is that it allows a user to be able to remotely activate the release of lift gas from the balloon while the user is on the ground and the balloon is in flight high some distance from the user.

To terminate flight of the balloon 810, the control system 830 as described above may include a shuttle (such as one of shuttles 304 or 600) attached to a top cap 830. The shuttle may include one or more cutting blades and may be connected to the payload via cord 835. The control system 830, when activated, creates a relatively large opening 850 (shown in FIG. 8C) in the balloon for lift gas to escape. In some embodiments, the control system 830 can be activated, for example, by releasing the payload 820 from the balloon 810. Although the payload 820 may be released from the balloon 810, the payload 820 remains tethered to the balloon 810 via cord 835. This may help avoid injury to persons or damage to other objects by preventing the payload 820 from free falling back to Earth.

In FIG. 8B, the balloon 810 starts to descend after the payload 820 is released. This is due to the loss of lift gas through an opening 850 created in the balloon 810. When payload 820 is released, it may descend a certain distance from the balloon 810. As described above, this descent causes weight of the payload 820 to pull on cord 835, thereby moving the shuttle coupled to the cord 835 in manner where at least one of the cutting blades of the shuttle cuts open the opening 850 in the balloon 810 for lift gas to escape.

As more lift gas escapes, the balloon 810 further descends. In FIG. 8C, the balloon 810 is shown even further deflated. By this time, most of the lift gas has been released from the balloon 710 as it approaches the ground.

Example Flow Diagram

FIG. 9 is a flow diagram 800 depicting an example of some of the aspects described above that may be employed to remotely terminate flight of a balloon, such as balloon 200, using a control system, such as control system 830, as described above. As previously discussed, the following operations do not have to be performed in the precise order described below. Rather, as mentioned above, various operations can be handled in a different order or simultaneously, and operations may be added or omitted.

In block 910, a signal may be received at a balloon having control system. For example, the signal may be sent from a control unit, such as control unit 840, located at a ground-based station. The control system may include a type of ballast, such a payload 820, releasably attached to the balloon. The ballast may also be coupled via a cord, such as cord 835, to a shuttle having one or more cutting blades, e.g., razor blades. The shuttle may be arranged at an apex of the balloon's envelope.

In block 920, the ballast may be released in response to the signal. For example, the signal may send a command to a releasing device that be configured to release the ballast from the balloon. The ballast may then descend from the balloon a certain distance.

In block 930, an opening may be created in the balloon envelope by causing contact between at least one of the cutting blades with a portion of the balloon envelope. For example, as the ballast descends, it pulls on the cord coupled to the shuttle so that at least one of the one or more blades can cut open the portion of the balloon envelope for lift gas to escape. The lift gas passes from the opening in the balloon envelope, and thus causes the balloon to descend.

While the examples above discuss using a single control system having a single track and shuttle to cut open a portion of the balloon envelope, other modifications are possible while still maintaining functionality of the control system described above. For example, in one alternative embodiment, multiple shuttles can be used on the same and/or different tracks. In addition, tracks may be attached to multiple portions of the balloon envelope. Each of these tracks may be configured at a different portion of the balloon envelope with a different shuttle being arranged along with the respective track. In this example, when the ballast/payload is released, each shuttle may be pulled thought their respective tracks in order to cut open multiple openings in the balloon envelope for the lift gas to escape. An advantage of using multiple tracks and/or shuttles is for efficiency and to provide redundancy for the fight termination control system.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A control system, the control system comprising:
a shuttle having one or more cutting blades, the cutting blades being configured to cut open a balloon envelope;
a tubular track attached to a section of the balloon envelope, the tubular track having a guiding portion arranged to receive and guide the shuttle along the tubular track;
a ballast attached to the shuttle such that when the ballast is released, the ballast is configured to move the shuttle along the tubular track in order to cause at least one of the cutting blades to cut open a portion of the balloon envelope and allow lift gas to escape from the balloon envelope.

2. The control system of claim 1, wherein the ballast is a payload releasably attached to the balloon envelope.

3. The control system of claim 1, further comprising a controllable release device attached to the ballast, the controllable release device being configured to release the ballast in order to cause the shuttle to move along the tubular track.

4. The control system of claim 3, further comprising a control unit in communication with the controllable release device, the control unit being configured to remotely activate the release of the ballast.

5. The control system of claim 1, wherein the shuttle is generally planar shaped.

6. The control system of claim 5, wherein the tubular track is further arranged to hold the shuttle against the balloon envelope.

7. The control system of claim 1, further comprising a housing arranged at an apex of the balloon envelope, the housing is adapted to stow the shuttle away from an outer shell of the balloon envelope until the ballast attached to the shuttle is released.

8. The control system of claim 1, further comprising a cord having first and second end portions and a main body portion, the first end portion being attached to the shuttle and the second end portion being attached to the ballast, the main body portion is disposed within the guiding portion of the tubular track.

9. The control system of claim 8, wherein the cord is configured to pull the shuttle through the guiding portion when the ballast is released.

10. A system, comprising:
a balloon having a balloon envelope; and
a control system for terminating flight of the balloon, the control system comprising:
a shuttle having one or more cutting blades, the cutting blades being configured to cut open the balloon envelope;
a tubular track attached to a section of the balloon envelope, the tubular track having a guiding portion arranged to receive and guide the shuttle along the tubular track;
a ballast attached to the shuttle such that when the ballast is released, the ballast is configured to move the shuttle along the tubular track in order to cause at least one of the cutting blades to cut open a portion of the balloon envelope and allow lift gas to escape from the balloon envelope.

11. The system of claim 10, wherein the ballast is a payload releasably attached to the balloon.

12. The system of claim 10, further comprising a controllable release device attached to the ballast, the controllable release device being configured to release the ballast in order to cause the shuttle to move along the tubular track.

13. The system of claim 12, further comprising a control unit in communication with the controllable release device, the control unit being configured to remotely activate the release of the ballast.

14. The system of claim 10, wherein the shuttle is generally planar shaped.

15. The system of claim 14, wherein the tubular track is further arranged to hold the shuttle against the balloon envelope.

16. The system of claim 10, further comprising a housing arranged at an apex of the balloon, the housing is adapted to stow the shuttle away from an outer shell of the balloon envelope until the ballast attached to the shuttle is released.

17. The system of claim 10, further comprising a cord having first and second end portions and a main body portion, the first end portion being attached to the shuttle and the second end portion being attached to the ballast, the main body portion is disposed within the guiding portion of the tubular track.

18. The system of claim 17, wherein the cord is configured to pull the shuttle through the guiding portion when the ballast is released.

19. A method of terminating flight of a balloon having a balloon envelope, comprising:
receiving a signal at control system arranged at an apex of the balloon envelope;
in response to receiving the signal releasing a ballast attached to a shuttle;
when the ballast is released, using a guiding portion of a tubular track attached to a section of the balloon envelope to guide the shuttle along the tubular track;

as the shuttle is guided along the tubular track, creating an opening in the balloon envelope by causing contact between a cutting blade of the shuttle and a portion of the balloon envelope; and allowing lift gas to escape through the opening so that the balloon envelope descends.

20. The method of claim 19, wherein creating the opening in the balloon envelope by causing contact comprises cutting open the portion of the balloon envelope with the cutting blade.

\* \* \* \* \*